(12) United States Patent
Birman et al.

(10) Patent No.: US 9,873,374 B2
(45) Date of Patent: Jan. 23, 2018

(54) FLAT DIAL WITH 3D APPEARANCE

(71) Applicant: Continental Automotive Systems, Inc., Auburn Hills, MI (US)

(72) Inventors: Vyacheslav Birman, Auburn Hills, MI (US); Authur S Brown, Sterling Heights, MI (US); Michael J Hartmeyer, West Bloomfield, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 431 days.

(21) Appl. No.: 14/555,212

(22) Filed: Nov. 26, 2014

(65) Prior Publication Data

US 2015/0151678 A1 Jun. 4, 2015

Related U.S. Application Data

(60) Provisional application No. 61/910,479, filed on Dec. 2, 2013.

(51) Int. Cl.
| | |
|---|---|
| *G01K 1/06* | (2006.01) |
| *B60Q 3/04* | (2006.01) |
| *G01D 13/02* | (2006.01) |
| *G01D 11/28* | (2006.01) |
| *G01D 13/04* | (2006.01) |

(52) U.S. Cl.
CPC ............. *B60Q 3/044* (2013.01); *G01D 11/28* (2013.01); *G01D 13/02* (2013.01); *G01D 13/04* (2013.01); *Y10T 29/49826* (2015.01)

(58) Field of Classification Search
CPC . B60Q 3/10–3/18; G01D 11/28; G01D 13/02; G01D 13/04

USPC ............................................ 362/23.01–23.22
See application file for complete search history.

(56) References Cited

U.S. PATENT DOCUMENTS

| | | | |
|---|---|---|---|
| 5,032,711 A | 7/1991 | Yamada | |
| 8,240,860 B2 | 8/2012 | Kato | |
| 2006/0092521 A1* | 5/2006 | Birman | ................. B60K 35/00 359/630 |
| 2010/0177113 A1 | 7/2010 | Gay et al. | |

FOREIGN PATENT DOCUMENTS

| | | |
|---|---|---|
| CN | 200983052 Y | 11/2007 |
| CN | 101160225 A | 4/2008 |
| WO | 2006008370 A2 | 1/2006 |
| WO | 2006049944 A1 | 5/2006 |
| WO | 2013/002828 A1 | 1/2013 |

OTHER PUBLICATIONS

FR search report dated Oct. 3, 2017 of parallel application FR 1402738.
Bulbing, des lampes qui creent l'illusion de la 3D dated Apr. 29, 2014.

* cited by examiner

Primary Examiner — Sean Gramling

(57) ABSTRACT

A dial assembly is provided that includes a dial surface including a flat surface and a plurality of lines formed on the flat surface projected from a 3D object that generate a 3D appearance. One or more light sources illuminate each of the lines of the plurality of lines. A method of forming a dial assembly is also provided. The method includes dividing a subject 3D dial with a plurality of equidistant planes and projecting edges of the planes onto a flat dial surface to form a plurality of lines to generate a 3D appearance on the flat dial surface.

6 Claims, 3 Drawing Sheets

FLAT DIAL WITH 3D APPEARANCE

CROSS-REFERENCE TO RELATED APPLICATIONS

This application claims the benefit of U.S. Provisional Application No. 61/910,479 filed Dec. 2, 2013, the disclosure of which is hereby incorporated by reference in its entirety.

TECHNICAL FIELD

The present disclosure relates to vehicle instrument panels and clusters, and more specifically, to a flat dial with a 3D appearance.

BACKGROUND

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include instrument panels to communicate information indicative of operation to an operator. Motor vehicles include instrument panels with several gauges and dials that communicate vehicle conditions such as speed, engine rpm, temperature, and oil pressure along with many other operational parameters. The appearance of the dials and gauges contribute to the overall aesthetic appearance of the vehicle interior. Three-dimensional dials provide a desired aesthetic appearance, but require non-planer features that can complicate manufacture and assembly.

Accordingly, it is desirable to design and develop an instrument panel that includes a flat panel display with features that add both increased functionality while providing desired three-dimensional appearance and effects.

SUMMARY

A dial assembly includes a dial face that provides a three-dimensional (3D) appearance on a flat surface.

In one form, which may be combined with or separate from the other forms provided herein, a dial assembly is provided that includes a dial surface including a flat surface and a plurality of lines formed on the flat surface projected from a 3D object that generate a 3D appearance. One or more light sources illuminate each of the lines of the plurality of lines.

In another form, which may be combined with or separate from the other forms provided herein, a method of forming a dial assembly is provided. The method includes dividing a subject 3D dial with a plurality of equidistant planes and projecting edges of the planes onto a flat dial surface to form a plurality of lines to generate a 3D appearance on the flat dial surface.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

Examples are reflected in the drawings, which will be described below. The drawings described herein are for illustration purposes only and are not intended to limit the scope of the present disclosure in any way.

DETAILED DESCRIPTION

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Examples of the invention are described below. It should be noted that these and other examples or embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

Figure 1:
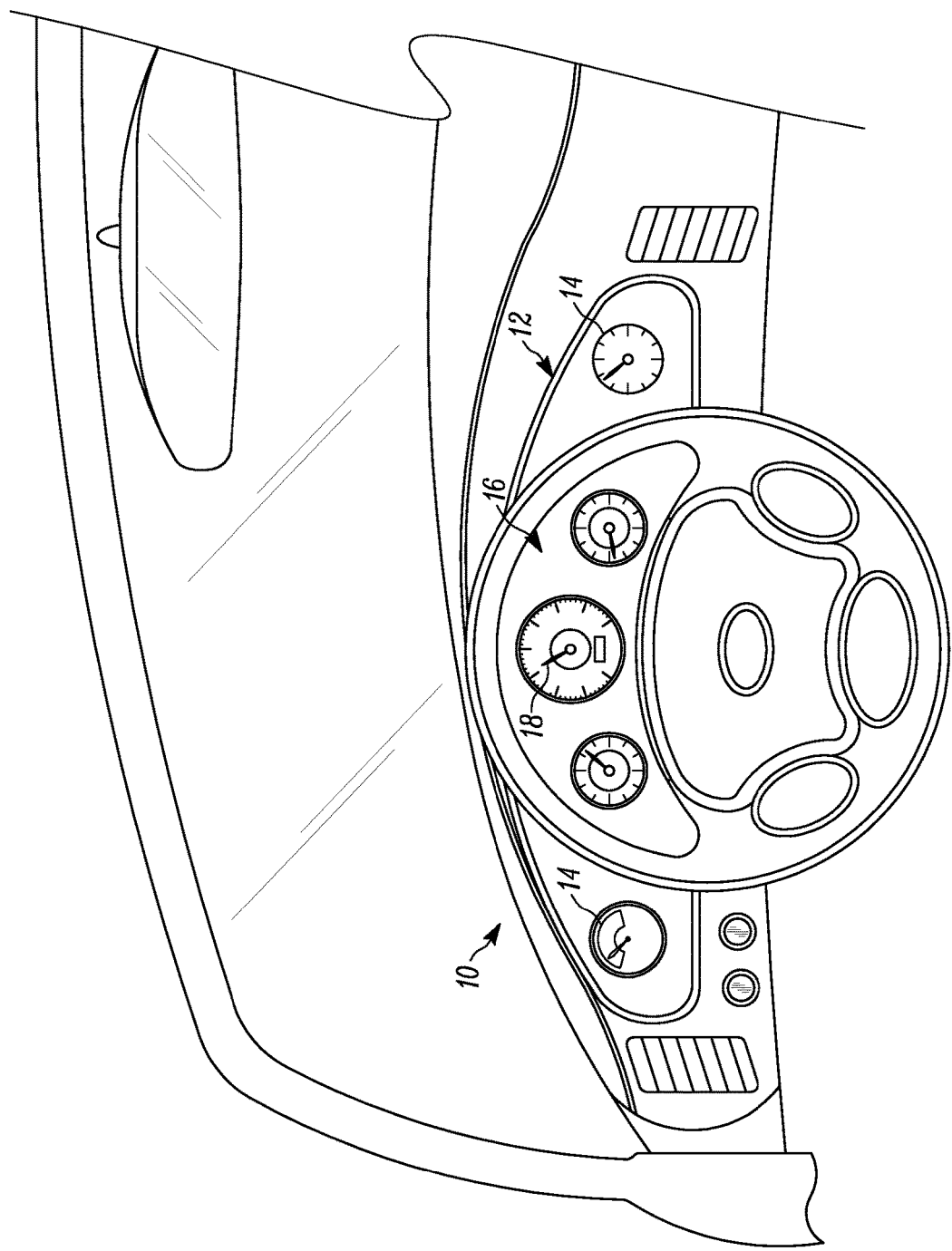
FIG. 1 is a schematic view of an example vehicle dashboard and instrument panel, in accordance with the principles of the present disclosure.

Referring to FIG. 1, a vehicle dashboard 10 is shown and includes an instrument panel 12 that includes a main dial assembly 16 and accessory gauges 14. The main dial assembly 16 includes a dial face 18 that provides a three-dimensional (3D) appearance on a flat surface.

Figure 2:
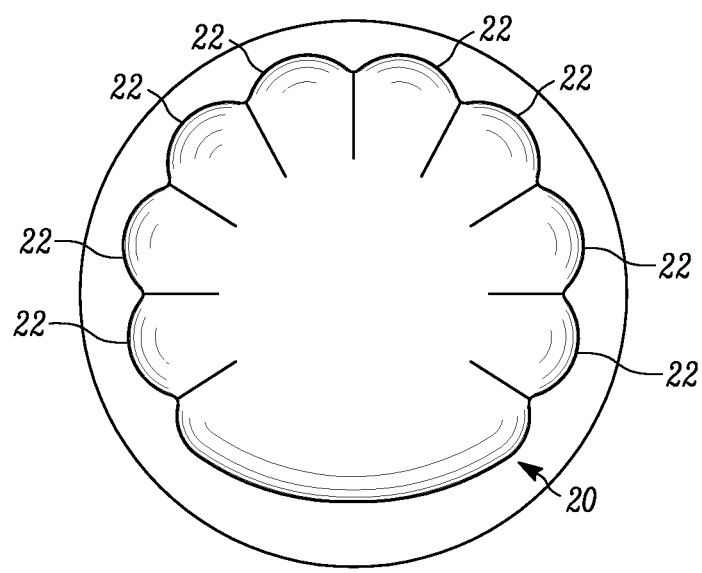
FIG. 2 is a plan view of a subject 3D dial.
Figure 3:
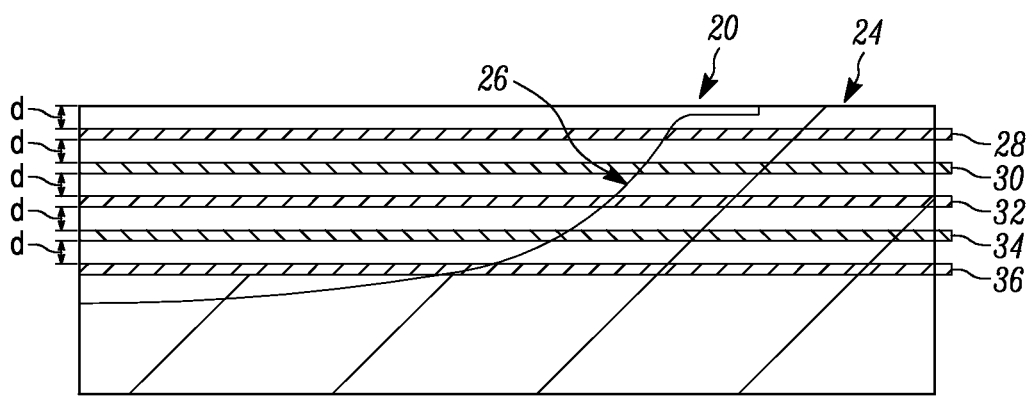
FIG. 3 is a cross-sectional view of the 3D dial of FIG. 2, having equidistant planes cut therethrough.
Figure 4:
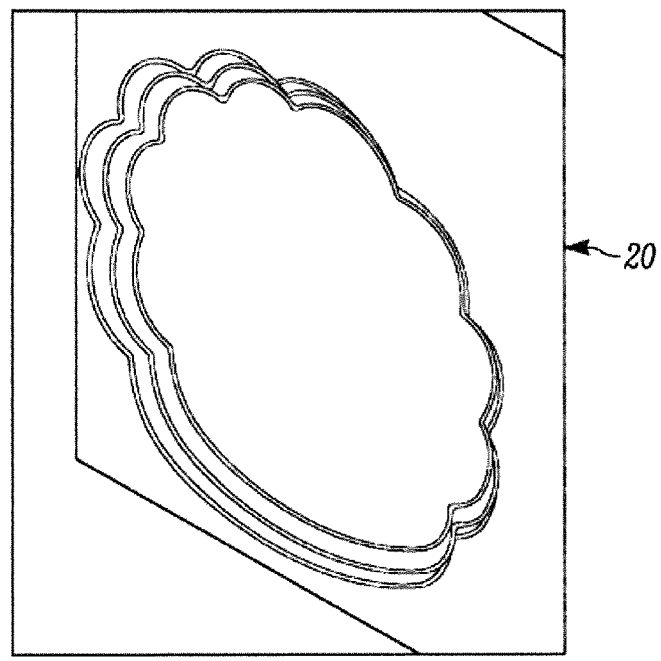
FIG. 4 is a perspective view of the subject dial of FIGS. 2-3.

Referring to FIGS. 2-4, the steps to creating the dial face 18 are illustrated using an example subject dial 20. The subject dial 20 is a drawing of an actual 3D dial; the subject dial 20 is a representation of an actual 3D shape 26 utilized in forming the flat dial face 38 (FIG. 5).

Referring to FIG. 3, the subject 20 is divided into a plurality of planes 28, 30, 32, 34, 36. The first plane 28 is spaced a distance d from the top surface 24; the second plane 30 is spaced the distance d from the first plane 28 and the third plane 32. The third plane 32 is also spaced the distance d from the fourth plane 34, and the fifth plane 36 is spaced the distance distance d from the fourth plane 34. Thus, each plane 28, 30, 32, 34, 36 is spaced an equal distance d from each adjacent plane 28, 30, 32, 34, 36, which is the same distance that the first plane 28 is spaced from the top surface 24. Thus, the subject 3D shape 26 of the subject 20 is divided by the plurality of planes 28, 30, 32, 34, 36 parallel to the top surface 24. Each of the planes 28, 30, 32, 34, 36 provides a location or plane for a projection along the flat dial surface 38 illustrated in FIG. 5. The planes 28, 30, 32, 34, 36 provide a map or guide for application to the flat dial surface 38.

Figure 5:
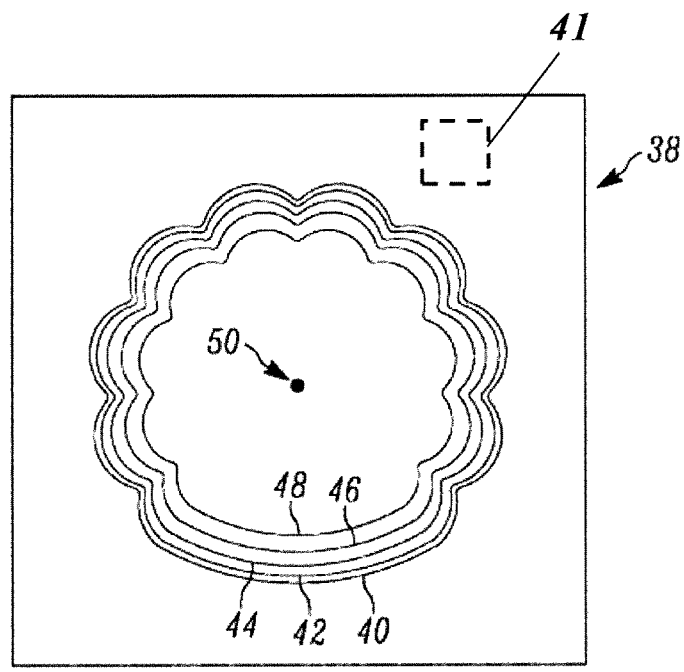
FIG. 5 is the flat dial of the instrument panel of FIG. 1, having the cross-sections of the planes shown in FIG. 3 projected onto the flat dial, in accordance with the principles of the present disclosure.

Referring to FIG. 5, with continued reference to FIGS. 2-4, the planes 28, 30, 32, 34 and 36 are projected onto the flat plane of the flat surface 38 shown in FIG. 5. Thus, the planes 28, 30, 32, 34, 36 and generate an appearance of multiple depths along lines 40, 42, 44, 46, 48 within the flat surface, when in reality, the lines 40, 42, 44, 46, 48 are all disposed in a single plane coplanar with the flat dial face 38. Each depth line 40, 42, 44, 46, 48 is not necessarily disposed an equal distance from each other depth line, because in the projected view, the depth lines 40, 42, 44, 46, 48 are on flat surface.

Each line 40, 42, 44, 46, 48 may emit a luminance originating from one or more light sources 41 disposed on a back side of the flat dial face 38. In one example, the luminance used in each line 40, 42, 44, 46, 48 representing a plane is varied to further generate an appearance of depth in the otherwise flat surface. For example, the luminance may increase in a direction away from the dial center point 50 (in one example). Both the shape and the change in luminance create the desired 3D appearance in the flat dial face 38.

In this example, the dial surface 20 further includes a plurality of curved portions 22 that further aid in generating the desired 3D appearance. In this example, the curved portions define a clam shape, as shown at 22' in FIG. 5. Other shapes may also be utilized and are within the contemplation of this disclosure.

The equidistant planes 28, 30, 32, 34 and 36 of the 3D subject 20 are projected onto the flat surface 38 of FIG. 5 to provide the desired 3D appearance. The projected lines 40, 42, 44, 46, 48, along with the change in luminance in a direction radially outward from a center point 50 of the dial face 38, generate the visual appearance of depth on the flat surface 38.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A dial assembly for a vehicle dashboard comprising:
    a dial surface including a flat surface and a plurality of lines formed on the flat surface projected from a 3D object that generate a 3D appearance; and
    at least one light source illuminating each of the lines of the plurality of lines;
    a first plane spaced a distance from and arranged in parallel relation to the dial surface;
    a second plane spaced the distance from the first plane and disposed in parallel relation to the first plane;
    wherein the location of each of the lines of the plurality of lines is determined by cutting a 3D subject dial face with at least the first plane and the second plane;
    wherein a shape of the 3D object is divided at least in part by the first plane and the second plane;
    wherein the first plane and the second plane are configured so that edges of the first plane and the second plane are projected to form the plurality of lines to generate the 3D appearance on the dial surface.

2. The dial assembly of claim 1, each line of the plurality of lines forming a plurality of scallop shapes.

3. The dial assembly of claim 2, wherein the dial assembly is disposed on a vehicle dashboard.

4. A method of forming a dial assembly for a vehicle dashboard, the method comprising:
    dividing a subject 3D dial with a first plane and a second plane; and
    projecting edges of the planes onto a flat dial surface to form a plurality of lines to generate a 3D appearance on the flat dial surface;
    wherein the first plane is spaced a distance from and arranged in parallel relation to the dial surface;
    wherein the second plane is spaced the distance from the first plane and disposed in parallel relation to the first plane;
    wherein the location of each of the lines of the plurality of lines is determined by cutting a 3D subject dial with at least the first plane and the second plane;
    wherein a shape of the 3D subject dial is divided at least in part by the first plane and the second plane;
    wherein the first plane and the second plane are configured so that edges of the first plane and the second plane are projected to form the plurality of lines to generate the 3D appearance on the dial surface.

5. The method of claim 4, further comprising illuminating the plurality of lines with at least one light source.

6. The method of claim 5, wherein the step of illuminating the plurality of lines includes illuminating each line of the plurality of lines in a varied manner that changes in a direction radially outward from a center of the dial surface for generating a desired 3D appearance on the flat dial surface.

* * * * *